United States Patent
Baaijens (10) Patent No.: US 8,111,004 B2
(45) Date of Patent: Feb. 7, 2012

(54) COLOR NAVIGATION SYSTEM

(75) Inventor: Johannes Petrus Wilhelmus Baaijens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 416 days.

(21) Appl. No.: 12/306,331

(22) PCT Filed: Jun. 22, 2007

(86) PCT No.: PCT/IB2007/052430
§ 371 (c)(1),
(2), (4) Date: Dec. 23, 2008

(87) PCT Pub. No.: WO2008/001290
PCT Pub. Date: Jan. 3, 2008

(65) Prior Publication Data
US 2009/0278470 A1 Nov. 12, 2009

(30) Foreign Application Priority Data
Jun. 27, 2006 (EP) .................................. 06116110

(51) Int. Cl.
*H05B 37/02* (2006.01)

(52) U.S. Cl. ........ 315/291; 315/308; 315/312; 315/360; 345/590

(58) Field of Classification Search ................... 315/291, 315/294, 297, 307, 308, 312, 316, 360; 345/76, 345/82, 83, 590–599
See application file for complete search history.

(56) References Cited

U.S. PATENT DOCUMENTS

| 6,639,574 | B2 * | 10/2003 | Scheibe | 345/83 |
| 6,778,185 | B1 * | 8/2004 | Moroney | 345/590 |
| 6,897,624 | B2 * | 5/2005 | Lys et al. | 315/297 |
| 7,049,769 | B2 * | 5/2006 | Boulouednine et al. | 315/324 |
| 7,067,995 | B2 * | 6/2006 | Gunter et al. | 315/312 |

(Continued)

FOREIGN PATENT DOCUMENTS
EP 1022897 A2 7/2000
(Continued)

OTHER PUBLICATIONS

Jia Wang et al; "Color Space Quantization for Color-Content-Based Query Systems", Multimedia Tools and Applications, Kluwer Academic Publichers, Boston, US, vol. 13, No. 1, pp. 73-91, Jan. 2001, XP008013023.

(Continued)

*Primary Examiner* — Tung X Le
(74) *Attorney, Agent, or Firm* — Mark L Beloborodov (57) ABSTRACT

A system and method for color navigation through a CIELAB color space with coordinates hue (H), lightness (L), chroma (C), with intervals $\Delta H$, $\Delta L$, $\Delta C$ such that the perceptual color difference $\Delta E1Nv$, defined according to the formula: $\Delta ZW = \sqrt{\{\Delta L)2 + \{fc(H) - \Delta Cf + [\Delta H)2\}}$, is constant for steps in direction C and L and for steps in direction H along boundary of color space. fc(H) is a proportionality factor between 0 and 1 depending on hue. For hue values between red (H1) and green (H2), fc(H) =1. For hue values between green (H2) and blue (H3), the proportionality factor fc(H) is set to a constant value foB such that $N\kappa,GB(fGB)$ differs less than 50% from $NH,RG$— For hue values between blue (H3) and red (H1), the proportionality factor fc(H) is set to a constant value $f\beta R$ such that $N^\hat{}BR\hat{}BR)$ differs less than 50% from $NH,RG$—.

9 Claims, 3 Drawing Sheets

U.S. PATENT DOCUMENTS

| | | | |
|---|---|---|---|
| RE39,161 E * | 7/2006 | Edge et al. | 345/601 |
| 7,515,128 B2 * | 4/2009 | Dowling | 345/83 |
| 7,701,465 B2 * | 4/2010 | Suzuki et al. | 345/601 |
| 7,710,433 B2 * | 5/2010 | Holub | 345/589 |
| 2002/0145394 A1 * | 10/2002 | Morgan et al. | 315/291 |
| 2004/0178751 A1 * | 9/2004 | Mueller et al. | 315/294 |
| 2004/0212320 A1 * | 10/2004 | Dowling et al. | 315/291 |
| 2005/0018054 A1 | 1/2005 | Kato | |
| 2005/0231133 A1 * | 10/2005 | Lys | 315/291 |
| 2006/0285184 A1 * | 12/2006 | Phillips et al. | 359/2 |

FOREIGN PATENT DOCUMENTS

| | | |
|---|---|---|
| EP | 1469454 A2 | 10/2004 |
| WO | 03015067 A1 | 2/2003 |
| WO | 2004086824 A1 | 10/2004 |
| WO | 2005124301 A2 | 12/2005 |
| WO | 2006046190 A2 | 5/2006 |

OTHER PUBLICATIONS

R.S. Gentile et al; "Quantization of Color Images Based on Uniform Color Spaces", 8188 Journal of Imaging Technology, vol. 16, No. 1, 1990, Springfield, VA, US, pp. 11-21, XP000101462.

B. Hill et al; "Comparative Analysis of the Quantization of Color Spaces on the Basis of the Cielab Color-Difference Formula", ACM Transactions on Graphics, vol. 16, No. 2, Apr. 1997, pp. 109-154.

* cited by examiner

COLOR NAVIGATION SYSTEM

This application is a national stage application under 35 U.S.C. §371 of International Application No. PCT/IB2007/052430 filed on Jun. 22, 2007, and published in the English language on Jan. 3, 2008, as International Publication No. WO/2008/001290, which claims priority to European Application No. 06116110.5, filed on Jun. 27, 2006, incorporated herein by reference.

FIELD OF THE INVENTION

The present invention relates in general to the field of lighting. More particularly, the present invention relates to a color navigation system for generating light with a variable color.

BACKGROUND OF THE INVENTION

Illumination systems for illuminating a space with a variable color are generally known. Generally, such systems comprise a plurality of light sources, each light source emitting light with a specific color, the respective colors of the different light sources being mutually different. The overall light generated by the system as a whole is then a mixture of the light emitted by the several light sources. By changing the relative intensities of the different light sources, the color of the overall light mixture can be changed.

It is noted that the light sources can be of different type, such as for instance TL lamp, halogen lamp, LED, etc. In the following, simply the word "lamp" will be used, but this is not intended to exclude LEDs.

By way of an example of a variable color illumination system, an illumination system in a theatre is mentioned. During a show, it may be desirable to change the color of the lighting. However, also in the case of homes, shops, restaurants, hotels, schools, hospitals, etc., it may be desirable to be able to change the color of the lighting. In the case of a theatre or the like, the colors are typically changed with a view to enhance dramatic effects, but in other situations it may be more desirable to have smooth and slow transitions.

As should be clear to a person skilled in the art, the color of light can be represented by coordinates of a color point in a color space. In such representation, changing a color corresponds to a displacement from one color point to another color point in the color space, or a displacement of the setting of the color point of the system. Further, a sequence of colors corresponds to a collection of color points in the color space, which collection will be indicated as a path. Dynamically changing the colors can then be indicated as "traveling" such path. More in general, dynamically changing the colors of lighting will be indicated as "navigating" through the color space.

Typically, an illumination system comprises three lamps. Usually, these lamps are close-to-red (R), close-to-green (G), close-to-blue (B), and the system is indicated as an RGB system. For each lamp, the light intensity can be represented as a number from 0 (no light) to 1 (maximum intensity). A color point can be represented by three-dimensional coordinates ($\xi_1$, $\xi_2$, $\xi_3$), each coordinate in a range from 0 to 1 corresponding in a linear manner to the relative intensity of one of the lamps. The color points of the individual lamps can be represented as (1,0,0), (0,1,0), (0,0,1), respectively. These points describe a triangle in the color space. All colors within this triangle can be generated by the system.

It is desirable to have a color navigation system, allowing a user to navigate through the color space in a comfortable and intuitive way. Specifically, it is desirable that a color navigation system allows the user to take such steps in the color space such that the perceived color change is constant.

In theory, the color space can be considered as being a continuum. This will allow a user to select every possible color within the above-mentioned triangle. However, calculating the stepsize in a certain step direction such that the perceived color change has a certain value requires the use of rather powerful and costly microprocessors. Therefore, it is more advantageous for a color navigation system to have a color table, comprising predefined color points. Navigating through color space then translates to making steps from one color point in the table to the next color point in the table. Navigation can then be performed easily under the control of a simple user interface. An example of such simple user interface comprises six buttons, two buttons (step-up and step-down, respectively) for each color coordinate. Actuating one of these buttons will result in a step along the corresponding color coordinate axis, the step resulting in a predefined color perception difference.

A problem in this respect is that the RGB color space is not a linear space, so that, when taking a discrete step of a certain size along one of the color intensity coordinate axes, the amount of color change perceived by the user is not constant but depends on the actual position within the color space.

In order to solve this problem, different representations of the color space have been proposed, such as the CIELAB color space, where the independent variables are hue (H), saturation (S; in CIELAB calculated with S=Chroma/Lightness), brightness (B; in CIELAB calculated from Lightness). Because of the perceptual uniformity of Lightness (i.e. a linear change of Lightness level is also perceived as a linear change of light intensity level by the user), it is advantageous to use this parameter instead of Brightness. However, to generalize the description the parameter "Brightness" will be used in the explanation next, which values are also described with a perceptual uniform distribution (e.g. in u'v'Y space, with "Y" describing intensity, perceptual uniform Brightness distribution is logarithm(Y)). The CIELAB color space can be seen as a three-dimensional space of discrete points (3D grid). Each point in this space can be represented by coordinates m, n, p, and in each point the hue (H), saturation (S), Brightness (B) have specific values H(m,n,p), S(m,n,p), B(m,n,p), respectively. A user can take a discrete step along any of the three coordinate axes, resulting in predefined and constant changes in hue, saturation or Brightness, respectively, as long as the color is inside the outer boundary of the color space (color gamut). In principle, the variables hue, saturation and Brightness are independent from each other.

A problem is now to define a good navigation algorithm, defining navigation steps such that the perceived color change is constant, in order to build a suitable table or in order to step through an existing table. According to the CIELAB theory, when a step is made from a first color point with Chroma value C1 and hue angle h1 to a second color point with Chroma value C2 and hue angle h2, the color difference ΔE is defined as $$\Delta E = \sqrt{\Delta L^2 + \Delta C^2 + \Delta H^2}$$

in which ΔH is the metric Hue difference, defined as ΔH=$\overline{C}$·Δh with $\overline{C}$ being the average of C1 and C2 and with Δh=h2−h1.

Although the above formula is precise according to theory, it appears not to be precise in people's actual perception. Thus, there is a need for an improved color difference formula that is better adapted to personal perception.

In the article "Comparative Analysis of the Quantization of Color Spaces on the Basis of the CIELAB Color-difference Formula" in ACM transactions on Graphics, Vol. 16, nr.2, April 1997, p. 109-154, B. Hill et al describe an improved color difference formula:

$$\Delta E_{94}^* = \sqrt{\left(\frac{\Delta L^*}{k_L S_L}\right)^2 + \left(\frac{\Delta C_{ab}^*}{k_C S_C}\right)^2 + \left(\frac{\Delta H_{ab}^*}{k_H S_H}\right)^2}$$

where $\Delta L^*$, $\Delta C^*_{ab}$, and $\Delta H^*_{ab}$ are the CIELAB 1976 color differences of lightness, chroma, and hue, respectively;
where $k_L$, $k_C$, and $k_H$ are factors to match the perception of background conditions;
and where $S_L$, $S_C$, and $S_H$ are linear functions of $C^*_{ab}$.

According to the article, standard values have been assumed as follows:

$k_L = k_C = k_H = 1$ $S_L = 1$ $S_C = 1 + 0.045 \cdot C^*_{ab}$ $S_H = 1 + 0.015 \cdot C^*_{ab}$ However, experiments of the present inventor have shown that the above formula does not give satisfying results. Thus, a first objective of the present invention is to provide a color difference formula giving more satisfying results in practical experiments.

A further aspect of the problem relates to the fact that the boundary of the color space is usually not a circle but has the general shape of a triangle with curved sides. In the case of saturated LED primaries, the blue primary creates a long elongated corner in the triangle, and the RED-GREEN side is relatively short. When a user navigates along this boundary in the hue direction, taking steps such that the perceived color difference $\Delta E$ in accordance with the above-mentioned formula is maintained constant, he will find that there are far more steps in the cyan-blue-magenta region than in the red-green region. This is not an attractive situation. This situation is caused by the fact that, when navigating along the boundary of the color space, it is not possible to keep both the lightness and the chroma constant, and differences in lightness and chroma are considered to contribute to perceived color differences. When navigating close to blue, differences in chroma are relatively large so that, when the perceived color difference is maintained constant, the steps in hue are relatively small.

Thus, it is a further objective of the present invention to provide a solution for this problem as well.

More particularly, the present invention aims to provide a method for calculating color steps resulting in a good compromise between the desire to have the steps being equidistant in perceived color differences on the one hand, and the desire to have substantially comparable numbers of color steps along the boundary of the color space on the other hand.

SUMMARY OF THE INVENTION

According to a first aspect of the present invention, a color difference formula is defined as follows:

$$\Delta E_{INV} = \sqrt{(\Delta L)^2 + (f_C(H) \cdot \Delta C)^2 + (\Delta H)^2}$$

wherein $\Delta E_{INV}$ indicates the color difference according to the present invention, and wherein $f_C(H)$ is a factor between 0 and 1 which only depends on hue H. This factor is suitably chosen such as to mitigate the effect of chroma on the perceived color difference.

According to a second aspect of the present invention, the color space is divided in three sectors RED-GREEN, GREEN-BLUE, and BLUE-RED, and values for $f_C(H)$ are defined such that the numbers of color points along the color space boundary in the hue direction for said three sectors are mutually equal, or at least do not differ more than 50%.

BRIEF DESCRIPTION OF THE DRAWINGS

These and other aspects, features and advantages of the present invention will be further explained by the following description with reference to the drawings, in which same reference numerals indicate same or similar parts, and in which.

DETAILED DESCRIPTION OF THE INVENTION

Figure 1:
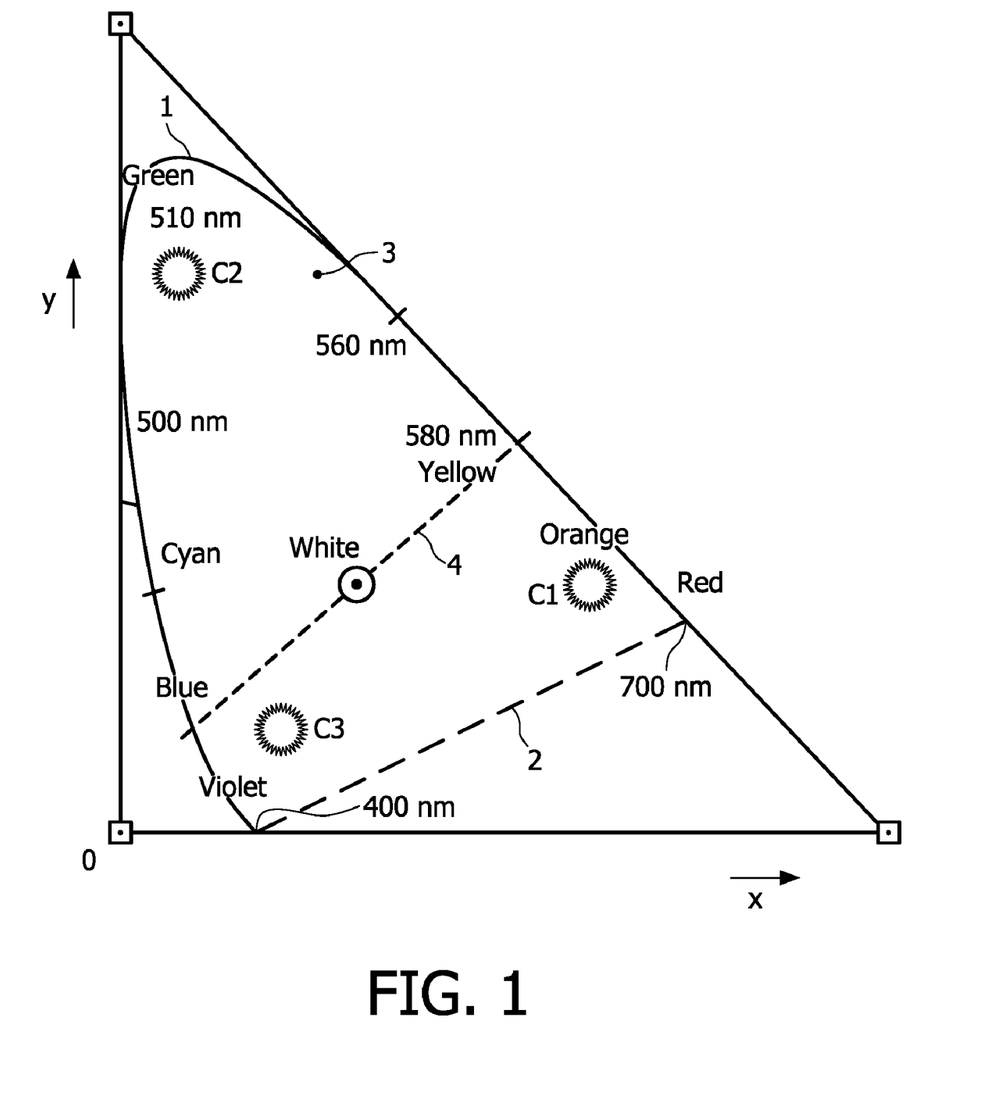
FIG. 1 schematically shows a chromaticity diagram.

FIG. 1 schematically shows a CIE(xy) chromaticity diagram. This diagram is well-known, therefore an explanation will be kept to a minimum. Points (1,0), (0,0), and (0,1) indicate ideal red, blue and green, respectively, which are virtual colors. The curved line 1 represents the pure spectral colors. Wavelengths are indicated in nanometers (nm). A dashed line 2 connects the ends of the curved line 1. The area 3 enclosed by the curved line 1 and dashed line 2 contains all visible colors; in contrast to the pure spectral colors of the curved line 1, the colors of the area 3 are mixed colors, which can be obtained by mixing two or more pure spectral colors. Conversely, each visible color can be represented by coordinates in the chromaticity diagram; a point in the chromaticity diagram will be indicated as a "color point".

It is noted that a different graphical color representation, for instance the RGB diagram, may also be used, as should be clear to a person skilled in this art. However, the distribution of colors in the RGB space is completely device-dependent (e.g. a certain RGB value will in general give different perceived colors with different lamps that each have different RGB primary colors).

Figure 2:
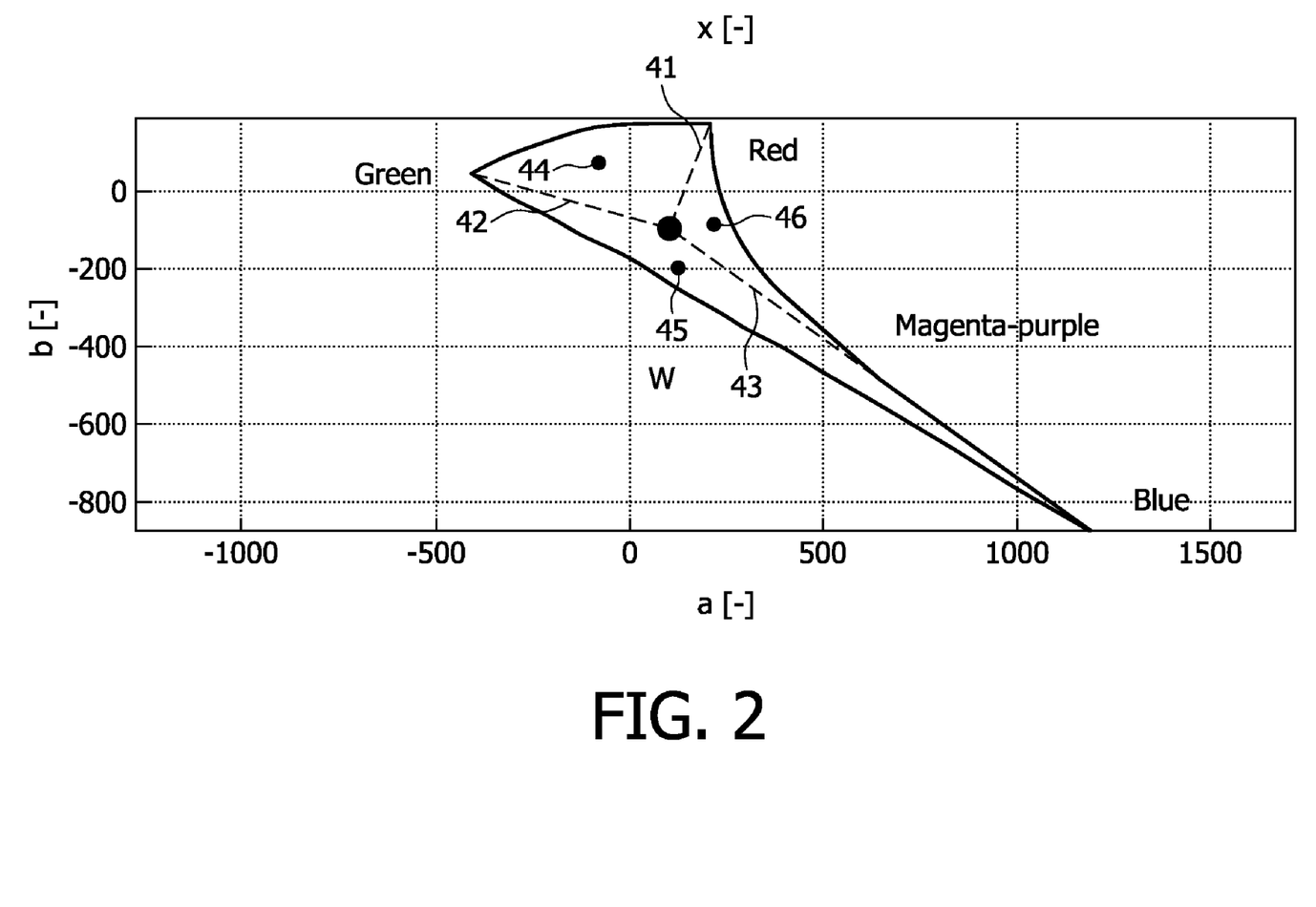
FIG. 2 schematically shows a CIELAB plot.

Preferably, the colors are represented in a device-independent color space, like the CIELAB color space, also referred to as the L*a*b* color space. FIG. 2 is a diagram illustrating the CIELAB space. The CIELAB space is preferred due to its perceptual uniformity; however, as mentioned above, it can clearly be seen that the CIELAB curve is distorted in comparison to the CIE(xy) diagram, with quite a large blue "tail".

Since the color definitions associated with these color spaces are known to persons skilled in this art, an extensive explanation will be omitted here. It suffices to mention that these spaces have hue (this will be explained hereinafter), saturation (this will be explained hereinafter), and brightness (a measure for the overall light intensity) as independent variables, and that a color representation in RGB space can be converted to a color representation in CIELAB color space, or vice versa, via one-to-one matrix transformations.

The basic concepts of Hue, Saturation and Brightness are most easily explained in the CIE 1931 (x,y) color space, although in other color space other definitions can be obtained. For simplicity, we use CIE 1931 (x,y) color space next.

When two pure spectral colors are mixed, the color point of the resulting mixed color is located on a line connecting the color points of the two pure colors, the exact location of the resulting color point depending on the mixing ratio (intensity ratio). For instance, when violet and red are mixed, the color point of the resulting mixed color purple is located on the dashed line 2. Two colors are called "complementary colors" if they can mix to produce white light. For instance, FIG. 1 shows a line 4 connecting blue (480 nm) and yellow (580 nm), which line crosses a white point, indicating that a correct intensity ratio of blue light and yellow light will be perceived as white light. The same would apply for any other set of complementary colors: in the case of the corresponding correct intensity ratio, the light mixture will be perceived as white light. It is noted that the light mixture actually still contains two spectral contributions at different wavelengths.

If the light intensity of two complementary colors (lamps) is indicated as I1 and I2, respectively, the overall intensity Itot of the mixed light will be defined by I1+I2, while the resulting color will be defined by the ratio I1/I2. For instance, assume that the first color is blue at intensity I1 and the second color is yellow at intensity I2. If I2=0, the resulting color is pure blue, and the resulting color point is located on the curved line 1. If I2 is increased, the color point travels the line 4 towards the white point. As long as the color point is located between pure blue and white, the corresponding color is still perceived as blue-ish, but closer to the white point the resulting color would be paler.

In the following, the word "color" will be used for the actual color in the area 3, in association with the phrase "color point". The "impression" of a color will be indicated by the word "hue"; in the above example, the hue would be blue. It is noted that the hue is associated with the spectral colors of the curved line 1; for each color point, the corresponding hue can be found by projecting this color point onto the curved line 1 along a line crossing the white point.

Further, the fact whether a color is a more or less pale hue will be expressed by the phrase "saturation". If a color point is located on the curve 1, the corresponding color is a pure spectral color, also indicated as a fully saturated hue (saturation=1). As the color point travels towards the white point, the saturation decreases (less saturated hue or paler hue); in the white point, the saturation is zero, per definition.

It is noted that many visible colors can be obtained by mixing two colors, but this does not apply for all colors, as can easily be seen from FIG. 1. In order to be able to produce light having any desired color, three lamps producing three different colors are needed. More lamps may be used, but that is not necessary.

Figure 3:
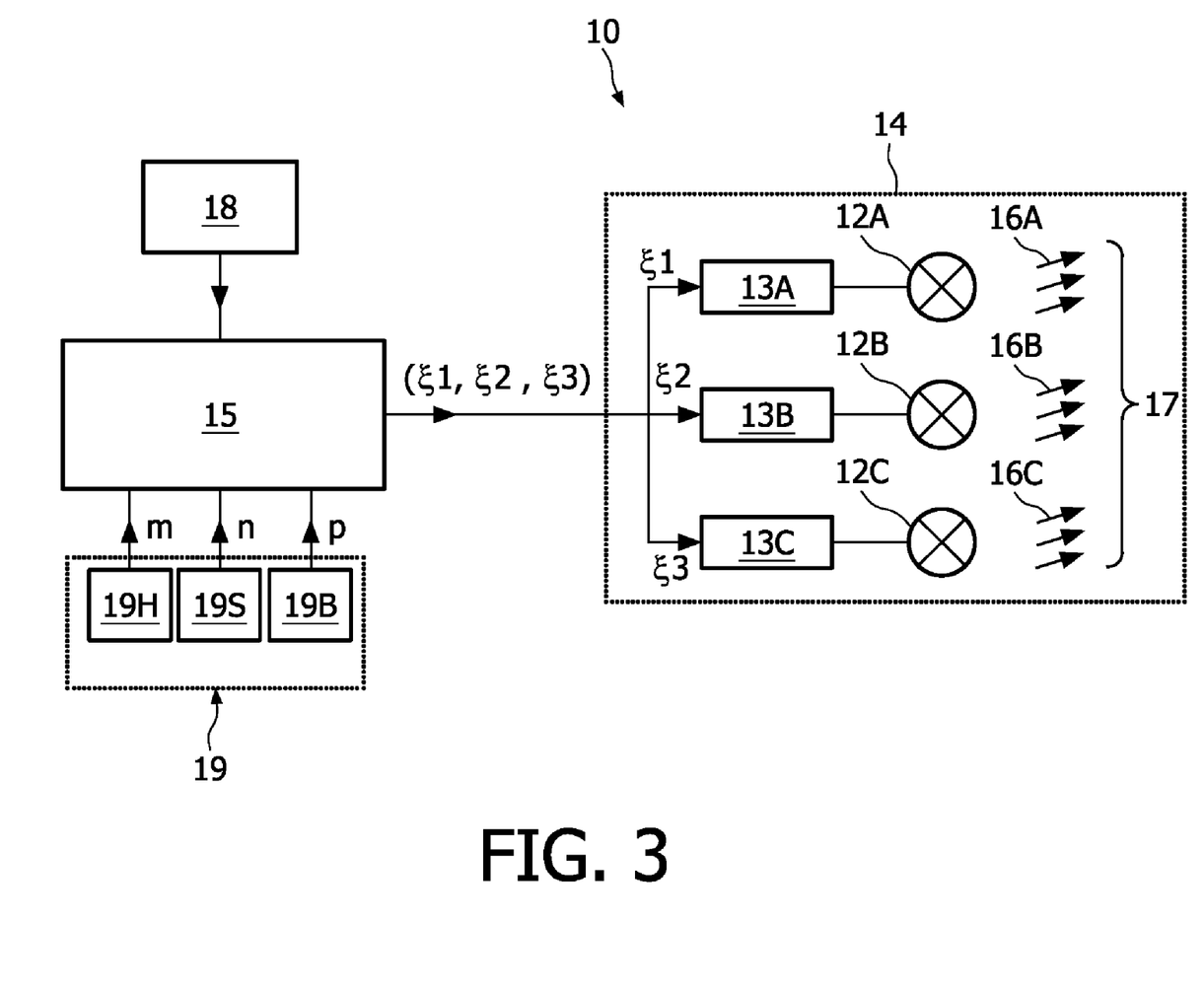
FIG. 3 is a block diagram schematically illustrating a color navigation system.

FIG. 3 schematically shows a block diagram of an illumination system 10, comprising a lamp assembly 14. The lamp assembly 14 comprises a plurality (here: three) of lamps 12A, 12B, 12C, each with an associated lamp driver 13A, 13B, 13C, respectively, controlled by a common controller 15. A user input device is indicated at 19. The three lamps 12A, 12B, 12C generate light 16A, 16B, 16C, respectively, with mutually different light colors; typical colors used are red (R), green (G), blue (B). Instead of pure red, green and blue, the lamps will typically emit light close-to-red, close-to-green and close-to-blue, as indicated by three exemplary color points C1, C2, C3 in FIG. 1, respectively. The overall light emitted by the lamp assembly 14 is indicated at 17; this overall light 17, which is a mixture of individual lights 16A, 16B, 16C, has a color point within the triangle defined by corner points C1, C2, C3. With the system 10, it is possible to set the mixture color of the output light mixture 17 at any desired location within said triangle, if it is possible to change the light intensities of the individual lamps 12A, 12B, 12C continuously. Typically, however, the controller 15 is a digital controller, and the light intensities of the individual lamps 12A, 12B, 12C can only be changed with discrete steps. In such case, the attainable color points are located along a grid in the color space. As regards color representation, CIELAB color space is preferred, because the distance between two neighboring grid points corresponds to substantially equal differences in perceived color over the entire CIELAB color space.

In the CIELAB color space, the hue, saturation and brightness can be varied independently from each other, as long as the color is inside the color space boundary. In the present invention, we use linear axes for Hue, Saturation and Lightness; these linear axes span the color space with cylindrical coordinates. Further, each axis is discretized, i.e. it is only possible to take discrete steps along each axis, respectively. Those steps are chosen such that corresponding steps in perceived color $\Delta E_{INV}$ are uniform. Here, the perceived color step is defined according to the following formula:

$$\Delta E_{INV} = \sqrt{(\Delta L)^2 + (f_C(H) \cdot \Delta C)^2 + (\Delta H)^2} \quad (1)$$

wherein $f_C(H)$ is a proportionality factor between 0 and 1 which only depends on hue H, as will be described later. Thus, the color space is filled with a grid of color points, wherein the distance between neighboring color points in the L-direction is indicated as $\Delta L$, the distance between neighboring color points in the C-direction is indicated as $\Delta C$, and the distance between neighboring color points in the H-direction is indicated as $\Delta H$. It is noted that C indicates chroma, defined as $C = S \cdot L$, S indicating saturation and L indicating lightness.

According to the invention proposal, the distribution of lightness levels is equidistant. Particularly, the lightness L can be varied from a minimum value Lmin (usually taken larger than zero) to a maximum value Lmax in equidistant steps. The number of possible lightness levels will be indicated by $N_L$. Then, using a "lightness index" p, the $N_L$ possible values of lightness L(p) can be expressed according to the following formula:

$$L(p) = Lmin + p \cdot \Delta L \quad (2)$$

wherein index p is an integer from 0 to $N_L - 1$.

It can easily be seen that $\Delta L = (Lmax - Lmin)/(N_L - 1)$. When stepping in the L-direction, $\Delta E_{INV} = \Delta L$ applies. It is noted that a linear increase of lightness is also perceived by human observers as a linear increase of brightness.

Further according to the invention proposal, the distribution of saturation levels is equidistant. Particularly, the saturation S can be varied from a minimum value Smin (usually equal to zero) to a maximum value Smax (usually equal to one) in equidistant steps. The number of possible saturation levels will be indicated by $N_S$. Then, using a "saturation index" n, the $N_S$ possible values of saturation S(n) can be expressed according to the following formula:

$$S(n) = Smin + n \cdot \Delta S \quad (3)$$

wherein index n is an integer from 0 to $N_S - 1$.

It can easily be seen that $\Delta S = (Smax - Smin)/(N_S - 1)$.

In view of the fact that $C = S \cdot L$, when stepping in the S-direction, $\Delta H = \Delta L = 0$, therefore $\Delta E_{INV} = f_C(H) \cdot \Delta C = f_C(H) \cdot \Delta S \cdot L$ applies. Thus, the perceived color differences are constant when stepping in the S-direction, but the size of these differences does depend on H and L.

Regarding the hue difference between two color points having chroma values C1 and C2, respectively, and having hue angles h1 and h2, respectively, it is noted that, in CIELAB, the metric Hue difference ΔH is used, defined along a hue circle around the color space boundary with:

$$\Delta H = \overline{C}^* \Delta h^*$$

with $\overline{C}^*$ being the arithmetic mean of C1 and C2 and with Δh=h1−h2. (H2−H1) is the metric length of the hue circle segment along the color space boundary (which is calculated as the sum of all ΔH differences between sequential colors along the boundary).

In prior art, the hue H is discretized over the entire color gamut from a suitably chosen minimum value Hmin to a suitably chosen maximum value Hmax in equidistant steps. As explained earlier, when navigating along the border of the color space taking steps of size ΔE, this results in a relatively large number of steps in the BLUE range (i.e. the difference in H between subsequent steps is relatively small in the BLUE range) and a relatively low number of steps in the range RED-GREEN. This is recognized by the present inventor as being caused by the fact that the chroma C is given the same weight over the entire color space. According to the present invention, discretization is done in a different way such as to reduce this problem. According to the present invention, the color space is divided in three sectors 44, 45, 46, as illustrated in FIG. 2, and the weight of the chroma C is set separately in these three sectors 44, 45, 46. In FIG. 2, a white point is indicated W. A line 41 of constant red hue connects white point W with a red color point; the corresponding hue is indicated as H1. A line 42 of constant green hue connects white point W with a green color point; the corresponding hue is indicated as H2. A line 43 of constant blue hue connects white point W with a blue color point; the corresponding hue is indicated as H3. A first color sector 44, extending from RED to GREEN and therefore indicated as the RED/GREEN sector, is defined between lines 41 and 42. A second color sector 45, extending from GREEN to BLUE and therefore indicated as the GREEN/BLUE sector, is defined between lines 42 and 43. A third color sector 46, extending from BLUE to RED and therefore indicated as the BLUE/RED sector, is defined between lines 43 and 41. The borderline of the color space is indicated as 47.

To define the Hue distribution, the following method is used. The lightness L is set at a certain level, preferably the lightness value for which Cmax is found, with Cmax being the maximum value of chroma C; this lightness value will be indicated as L(Cmax). While keeping lightness L constant, i.e. ΔL=0, the borderline 47 is navigated with steps of size $\Delta E_{INV}$ being constant. It should be clear that, with each step, chroma and hue change according to the following formula derived from formula 1:

$$\Delta E_{INV} = \sqrt{(f_C(H) \cdot \Delta C)^2 + (\Delta H)^2} \quad (4)$$

With each such step, a color point is reached having a certain Hue value H(m), m being a hue index. These values H(m) will be used as the discretized values of the hue axis, i.e. the hue coordinates of the grid of color points.

In the RED/GREEN sector 44, the proportionality factor $f_C(H)$ is set to be equal to 1, and the resulting number of steps from H1 (red) to H2 (green) will be indicated by $N_{H,RG}$.

In the GREEN/BLUE sector 45, the proportionality factor $f_C(H)$ is set to a constant value $f_{GB}$, and the resulting number of steps from H2 (green) to H3 (blue) will be indicated by $N_{H,GB}(f_{GB})$, indicating that this number of steps depends on $f_{GB}$.

In the BLUE/RED sector 46, the proportionality factor $f_C(H)$ is set to a constant value $f_{BR}$, and the resulting number of steps from H3 (blue) to H1 (red) will be indicated by $N_{H,BR}(f_{BR})$, indicating that this number of steps depends on $f_{BR}$.

In the prior art, $f_{GB}$ and $f_{BR}$ are equal to 1, but this has the problem that it would result in large differences between $N_{H,RG}$, $N_{H,GB}$ and $N_{H,BR}$. According to the invention, this problem is solved by selecting $f_{GB}$ and $f_{BR}$ smaller than 1, ideally such that $N_{H,RG}=N_{H,GB}(f_{GB})=N_{H,BR}(f_{BR})$, but in any case such that $N_{H,GB}(f_{GB})$ and $N_{H,BR}(f_{BR})$ differ less than 50% from $N_{H,RG}$. In a practical experiment, values $f_{GB}=f_{BR}=0.5$ proved to be satisfactory.

Thus, the complete trajectory of the borderline is divided into $N_{H,RG}+N_{H,GB}(f_{GB})+N_{H,BR}(f_{BR})$ steps. In other words, the number of possible hue levels, indicated as $N_H$, is equal to $N_{H,RG}+N_{H,GB}(f_{GB})+N_{H,BR}(f_{BR})$. Those levels, which can be indicated by a hue index m, are not equidistant, but have mutual distances ΔH(H), i.e. the size of the steps ΔH depends on the actual value of the hue, in such a way that, when stepping from one hue level to the next along the borderline 47, the above formula 4 is obeyed.

Thus, the invention describes a particularly advantageous way of discretizing the color space. Navigation through the colors that are generated by this discretization results in approximately perceptual equidistant color steps $\Delta E_{INV}$ along the axes of Saturation and Brightness as long as the colors are inside the color space boundary, and in approximately perceptual equidistant color steps $\Delta E_{INV}$ when stepping in the hue direction along the color space boundary. Thus, the distribution is not equidistant for hue within the color space boundary, but results in a better distribution along the color space boundary. A further advantage is that the overall number of steps in the hue direction can be smaller, thus the required memory space for the color table can be reduced.

It should be noted that, when using the CIELAB color space, a certain reference white point has to be chosen. The preferred choice, based on the experience of the inventor, is to choose a white point on the blackbody line (described with (x_ref,y_ref) in CIE1931 space) with the same correlated color temperature (CCT) as the RGB luminaire with RGB=[1 1 1], i.e. the luminaire at full light output. Alternatively, an arbitary white point with a CCT between 2500 [K] and 6500 [K] can be used.

From the above, it follows that points in the color space can be defined by indices m, n, p, and the color in those points can be considered as being a function of 3 independent parameters m, n, p. FIG. 3 illustrates that the user input device 19 allows the user to independently select values for m, n and p; particularly, the user is allowed to take steps along the axes of Lightness, Saturation and Hue. The user input device 19 is shown as a combination of three independent input devices 19H, 19S and 19B, independently providing input values m, n, p for the controller 15. On the basis of those input values m, n, p, the controller generates a set of control signals (ξ1, ξ2, ξ3) for the drivers 13A, 13B, 13C of the lamp assembly 14.

The controller 15 is provided with a memory 18 which contains tables for hue, saturation and brightness, respectively. Using the user instructions received from user interface 19, the controller 15 takes values for hue, saturation and brightness from said memory 18 and generates its control signals (ξ1, ξ2, ξ3) on the basis of these values.

The present invention provides two possible implementations. In a first implementation, the tables in the memory 18 are filled using the above-described formulas. In that case, navigating through the color space on the basis of the tables from memory 18 always results in perceptually uniform color steps. Such implementation does not require any specific adaptation of a microprocessor: when taking a step from one color point to the next, the controller 15 simply takes the next information from the table. Thus, the invention is embodied in the contents of the table in the memory.

In a second implementation, the table in the memory 18 may be filled in an arbitrary way (but with Hue values increasing monotonically with increasing index 'm', Saturation values increasing monotonically with increasing index 'n', and Lightness values increasing monotonically with increasing index 'p'), and the invention is embodied in the controller 15. The user is allowed to enter a navigation command defining a certain color step of size $\Delta E_{INV}$ in a certain direction. The controller 15, on receiving the navigation command from the user, calculates the corresponding values of $\Delta L$, $\Delta C$, $\Delta H$, and then looks in the table for the color point closest to color point defined by the calculated values of $\Delta L$, $\Delta C$, $\Delta H$.

It should be clear to a person skilled in the art that the present invention is not limited to the exemplary embodiments discussed above, but that several variations and modifications are possible within the protective scope of the invention as defined in the appending claims.

For instance, in the example the color table 18 is associated with the controller 15. It is, however, also possible that the color table 18 is associated with the user interface 19.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A memory comprising discrete color points and suitable for use with a color navigation system generating light with a variable color, the color points defined according to three-dimensional CIELAB coordinates hue (H), lightness (L), chroma (C), with predefined intervals $\Delta H$ between neighboring color points in the hue direction, with predefined intervals $\Delta L$ between neighboring color points in the lightness direction, and with predefined intervals $\Delta C$ between neighboring color points in the chroma direction, respectively;

wherein $\Delta L$ is equidistant over the color space; and
wherein $\Delta S$ is equidistant over the color space, with $\Delta C = \Delta S \cdot L$, S indicating saturation;
such that the perceptual color difference $\Delta E_{INV}$, defined according to the formula:

$$\Delta E_{INV} = \sqrt{(\Delta L)^2 + (f_C(H) \cdot \Delta C)^2 + (\Delta H)^2}$$

is substantially constant over the color space for steps in the L direction and in the S direction;
wherein $f_C(H)$ is a proportionality factor between 0 and 1 only depending on hue H;
wherein, for hue values H between a first hue value (H1) corresponding to red and a second hue value (H2) corresponding to green, the proportionality factor $f_C(H)$ is equal to 1 and the number of color points in the hue direction in this range is equal to $N_{H,RG}$;
wherein, for hue values between the second hue value (H2) corresponding to green and a third hue value (H3) corresponding to blue, the proportionality factor $f_C(H)$ is set to a constant value $f_{GB}$ such that the number $N_{H,GB(fGB)}$ of color points in the hue direction in this range differs less than 50% from $N_{H,RG}$, $N_{H,GB(fGB)}$ being equal to $N_{H,RG}$;
wherein, for hue values between the third hue value (H3) and the first hue value (H1), the proportionality factor $f_C(H)$ is set to a constant value $f_{BR}$ such that the number $N_{H,BR(fBR)}$ of color points in the hue direction in this range differs less than 50% from $N_{H,RG}$; and
wherein $\Delta H$ is a function of H such that, for steps in the hue direction along the border of the color space, said perceptual color difference $\Delta E_{INV}$ is substantially constant.

2. A user input device, comprising a memory according to claim 1.

3. A color navigation system for generating light with a variable color, comprising:
a memory according to claim 1;
a lamp assembly capable of generating light with a variable color;
a controller for controlling the lamp assembly; and
a user input device coupled to the controller;
wherein the controller is configured, on the basis of data (m,n,p) received from the user input device and on the basis of the information in the memory to generate color control signals ($\xi 1$, $\xi 2$, $\xi 3$) for the lamp assembly, such that the color point of the generated light corresponds to the user data.

4. A color navigation system according to claim 3, wherein the controller is configured to navigate through the CIELAB color space with steps $\Delta H$ in the hue direction, steps $\Delta L$ in the lightness direction, and steps $\Delta C$ in the chroma direction, or a combination of such steps; and
the controller is configured, in response to the user input data and taking into account a current color point, to calculate a target color point based on said steps $\Delta H$, $\Delta L$, $\Delta C$, to take from memory data relating to a color point closest to the target color point, and to generate its color control signals ($\xi 1$, $\xi 2$, $\xi 3$) for the lamp assembly on the basis of these data from memory.

5. A color navigation system according to the claim 3, wherein a white point (W) is an arbitrary white point with a correlated color temperature between 2500 K and 6500 K.

6. A color navigation system according to the claims 3, wherein a white point (W) is selected on the blackbody line, described with ($x_{REF}$, $y_{REF}$) in CIE1931 space, with the same correlated color temperature as the RGB luminaire with RGB=[1 1 1], i.e. the luminaire at full light output.

7. A method for providing a memory defining discrete color points in a color space, the method comprising the steps of:
defining color points according to three-dimensional CIELAB coordinates hue (H), lightness (L), chroma (C), with predefined intervals $\Delta H$ between neighboring color points in the hue direction, with predefined intervals $\Delta L$ between neighboring color points in the lightness direction, and with predefined intervals $\Delta C$ between neighboring color points in the chroma direction, respectively;
wherein $\Delta L$ is equidistant over the color space;
wherein $\Delta S$ is equidistant over the color space, with $\Delta C = \Delta S \cdot L$, S indicating saturation, such that the perceptual color difference $\Delta E_{INV}$, defined according to the formula:

$$\Delta E_{INV} = \sqrt{(\Delta L)^2 + (f_C(H) \cdot \Delta C)^2 + (\Delta H)^2},$$

is substantially constant over the color space for steps in the L-direction and in the S-direction;

wherein $f_{C(H)}$ is a proportionality factor between 0 and 1 only depending on hue H;

wherein, for hue values H between a first hue value (H1) corresponding to red and a second hue value (H2) corresponding to green, the proportionality factor $f_{C(H)}$ is equal to 1 and the number of color points in the hue direction in this range is equal to $N_{H,RG}$;

wherein, for hue values between the second hue value (H2) corresponding to green and a third hue value (H3) corresponding to blue, the proportionality factor $f_{C(H)}$ is set to a constant value $f_{GB}$ such that the number $N_{H,GB(fGB)}$ of color points in the hue direction in this range differs less than 50% from $N_{H,RG}$, $N_{H,GB(fGB)}$ being equal to $N_{H,RG}$;

wherein, for hue values between the third hue value (H3) and the first hue value (H1), the proportionality factor $f_{C(H)}$ is set to a constant value $f_{GB}$ such that the number $N_{H,BR(fBR)}$ of color points in the hue direction in this range differs less than 50% from $N_{H,RG}$, $N_{H,BR(fBR)}$ being equal to $_{NH,RG}$; and wherein ΔH is a function of H such that, for steps in the hue direction along the border of the color space, said perceptual color difference $\Delta E_{INV}$ is substantially constant;

for each of the color point thusly defined, calculating corresponding color control values (ξ1, ξ2, ξ3) and writing those values into the memory.

8. A method for navigating a lamp assembly, capable of generating light with a variable color, through a three-dimensional CIELAB color space, the method comprising the steps of:

providing a memory according to claim 7;

receiving user input data (m,n,p);

responsive to the user input data (m,n,p) and on the basis of the information in the memory, generating color control signals (ξ1, ξ2, ξ3) for the lamp assembly, such that the color point of the generated light corresponds to the user data; and responsive to the user input data (m,n,p), calculating a step ΔH in the hue direction, a step ΔL in the lightness direction, and a step ΔC in the chroma direction, or a combination of such steps, taking into account a current color point, calculating a target color point based on said steps ΔH, ΔL, ΔC, and generating the color control signals (ξ1, ξ2, ξ3) for the lamp assembly in conformity with the target color point.

9. A method for navigating a lamp assembly according to claim 8, further comprising the step of taking from memory data relating to a color point closest to the target color point, and generating the color control signals (ξ1, ξ2, ξ3) for the lamp assembly in conformity with these data from memory.

* * * * *